(12) United States Patent
Mishuku

(10) Patent No.: US 8,112,688 B2
(45) Date of Patent: Feb. 7, 2012

(54) DATA-TRANSMISSION CONTROL METHOD AND TRANSMISSION DEVICE

(75) Inventor: Tetsuya Mishuku, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 832 days.

(21) Appl. No.: 12/280,991

(22) PCT Filed: Apr. 19, 2006

(86) PCT No.: PCT/JP2006/308203
§ 371 (c)(1),
(2), (4) Date: Aug. 28, 2008

(87) PCT Pub. No.: WO2007/129358
PCT Pub. Date: Nov. 15, 2007

(65) Prior Publication Data
US 2009/0204866 A1    Aug. 13, 2009

(51) Int. Cl.
*H04L 1/18* (2006.01)
(52) U.S. Cl. ........ 714/749; 714/701; 714/708; 714/748; 370/474; 370/332; 370/389
(58) Field of Classification Search .................. None
See application file for complete search history.

(56) References Cited

U.S. PATENT DOCUMENTS

| | | | | |
|---|---|---|---|---|
| 4,720,829 A | * | 1/1988 | Fukasawa et al. | 714/701 |
| 5,313,473 A | * | 5/1994 | Darmon et al. | 714/751 |
| 5,751,743 A | * | 5/1998 | Takizawa | 714/774 |
| 6,567,397 B1 | * | 5/2003 | Campana et al. | 370/349 |
| 2004/0010736 A1 | * | 1/2004 | Alapuranen | 714/100 |
| 2005/0147078 A1 | | 7/2005 | Arima et al. | |
| 2005/0226239 A1 | * | 10/2005 | Nishida et al. | 370/389 |
| 2007/0223390 A1 | | 9/2007 | Kobayashi et al. | |
| 2010/0008342 A1 | * | 1/2010 | Nishida et al. | 370/338 |

FOREIGN PATENT DOCUMENTS

| | | |
|---|---|---|
| JP | 1 181251 | 7/1989 |
| JP | 3 99538 | 4/1991 |
| JP | 10 79724 | 3/1998 |
| JP | 2001 7785 | 1/2001 |
| JP | 2004-349884 | * 12/2004 |
| JP | 2004 349884 | 12/2004 |

* cited by examiner

*Primary Examiner* — John Trimmings
(74) *Attorney, Agent, or Firm* — Oblon, Spivak, McClelland, Maier & Neustadt, L.L.P.

(57) ABSTRACT

A data-transmission control method is implemented when transmitting data after dividing the data into a plurality of blocks and performing error correction when performing data transmission. The method includes obtaining additional information indicating a result of error correction process of received data and a result of data transmission (ACK/NACK) from a reception station, and deciding a data length of data to be retransmitted when NACK is obtained as the result of data transmission so that a rate of occurrence of transmission errors upon retransmission is minimized, based on a number of blocks in which error correction has failed indicated by the additional information.

12 Claims, 8 Drawing Sheets

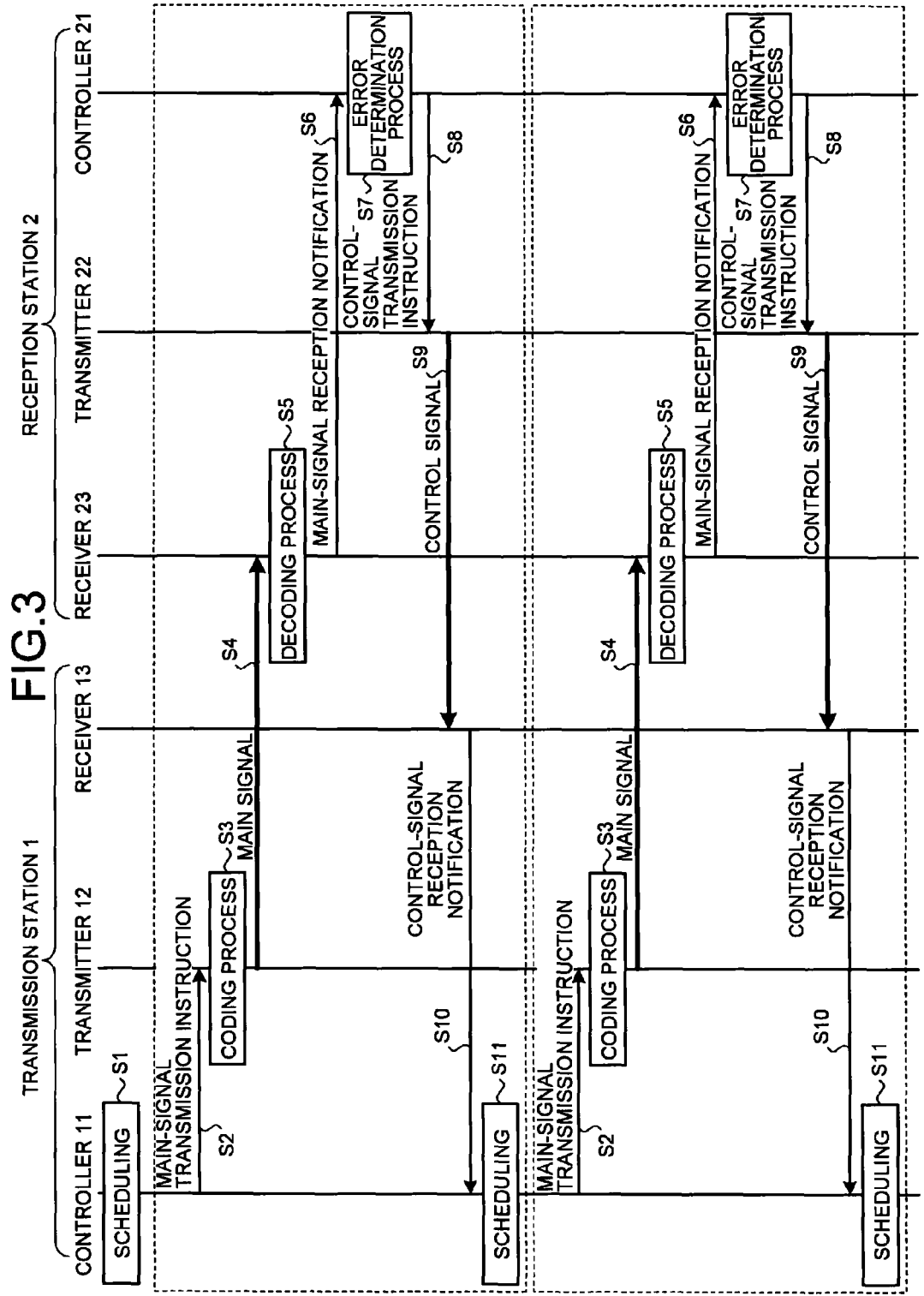

FIG.4

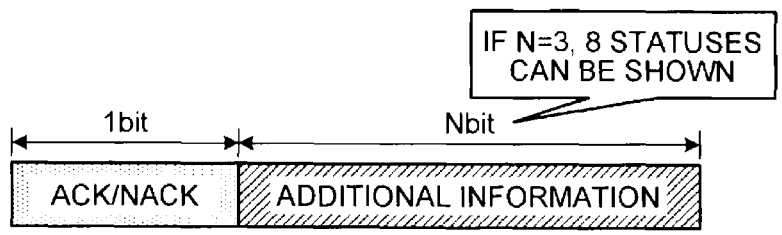

1bit | Nbit
ACK/NACK | ADDITIONAL INFORMATION

IF N=3, 8 STATUSES CAN BE SHOWN

FIG.5

| VALUE | MEANING PART 1 | MEANING PART 2 | MEANING PART 3 |
|---|---|---|---|
| 0 | NUMBER OF NG CODES=1 | NUMBER OF NG CODES=1 | NUMBER OF NG CODES=1 |
| 1 | NUMBER OF NG CODES=2 | NUMBER OF NG CODES=3 OR LESS | NUMBER OF NG CODES=2 |
| 2 | NUMBER OF NG CODES=3 | NUMBER OF NG CODES=5 OR LESS | NUMBER OF NG CODES=3 |
| 3 | NUMBER OF NG CODES=4 | NUMBER OF NG CODES=7 OR LESS | NUMBER OF NG CODES=5 OR LESS |
| 4 | NUMBER OF NG CODES=5 | NUMBER OF NG CODES=9 OR LESS | NUMBER OF NG CODES=7 OR LESS |
| 5 | NUMBER OF NG CODES=6 | NUMBER OF NG CODES=11 OR LESS | NUMBER OF NG CODES=9 OR LESS |
| 6 | NUMBER OF NG CODES=7 | NUMBER OF NG CODES=13 OR LESS | NUMBER OF NG CODES=11 OR LESS |
| 7 | NUMBER OF NG CODES=8 OR MORE | NUMBER OF NG CODES=14 OR MORE | NUMBER OF NG CODES=12 OR MORE |

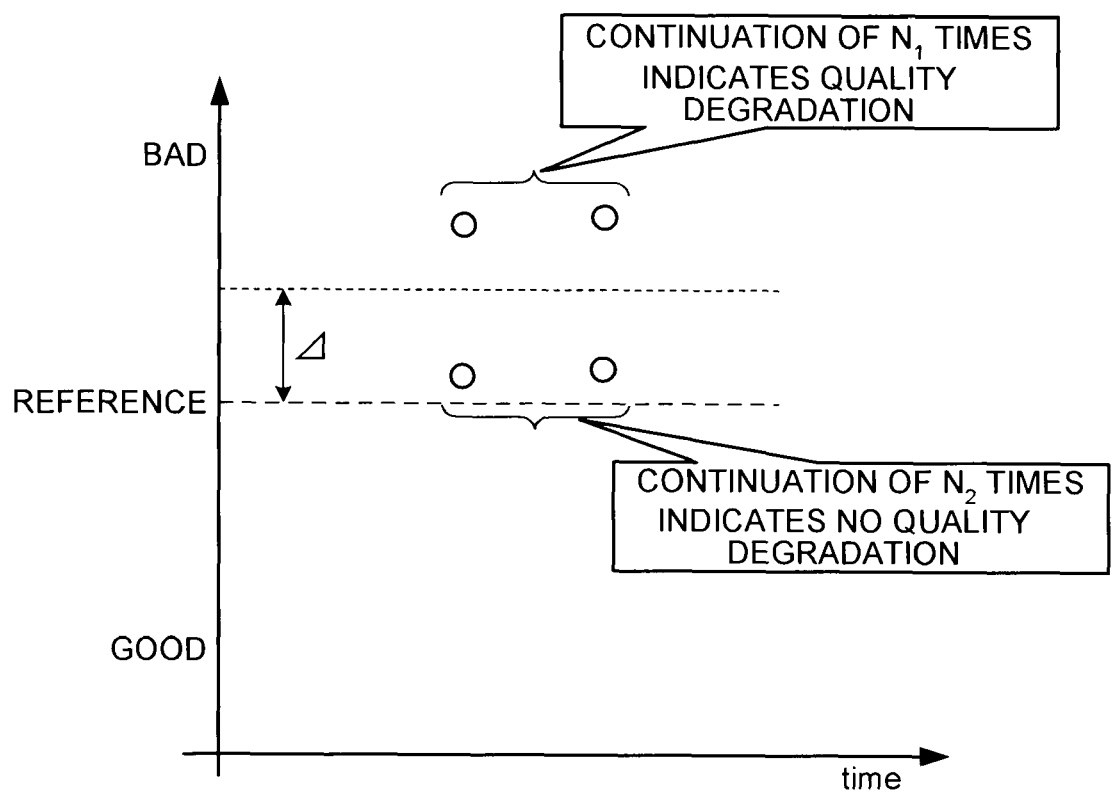

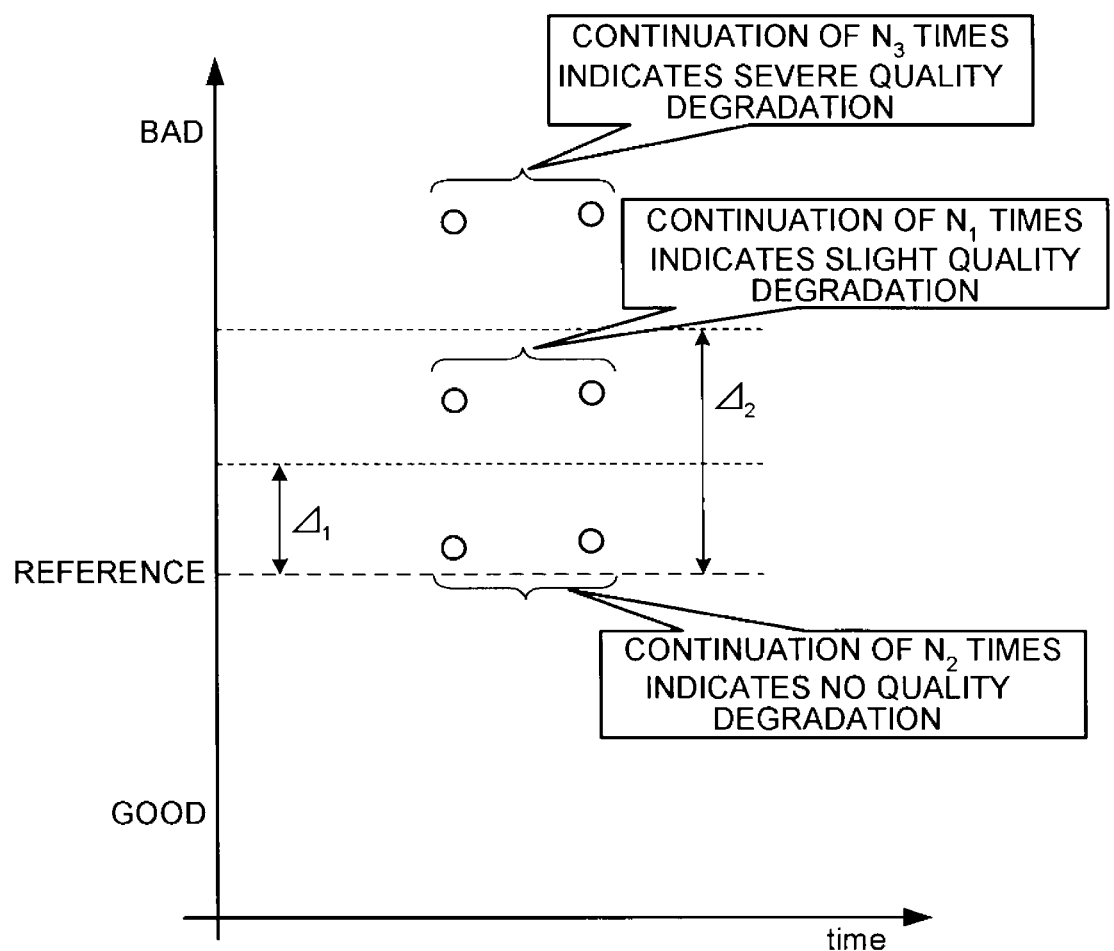

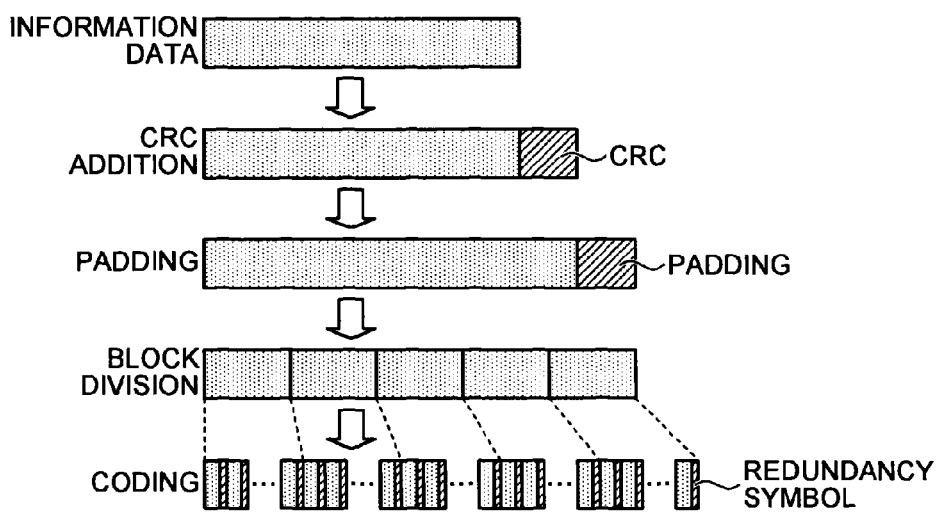
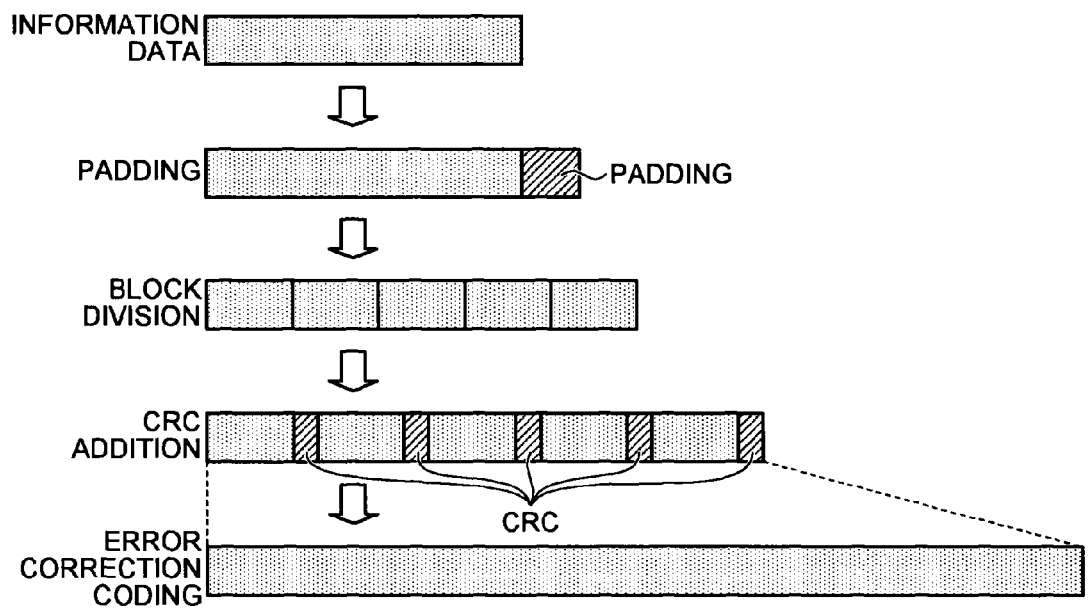

DATA-TRANSMISSION CONTROL METHOD AND TRANSMISSION DEVICE

TECHNICAL FIELD

The present invention relates to a data-transmission control method for controlling data transmission performed by combining error correction with retransmission control, and to a transmission device. The present invention more particularly relates to a data-transmission control method implemented when transmitting transmission data after dividing the transmission data into a plurality of blocks.

BACKGROUND ART

One of tasks in data transmission is to improve a throughput by minimizing the rate of occurrence of transmission errors. For example, if data of 100,000 bits is transmitted in a transmission path with a bit error rate of, for example, 0.01%, an error of 10 bits occurs. On the other hand, when data of 1,000 bits is transmitted, an error of 0.1 bit occurs. In other words, the rate of occurrence of transmission error decreases with the decrease in the data length.

A retransmission control method that reduces the possibility of occurrence of transmission errors is available (e.g., Patent document 1 explained below). In the retransmission control method, the rate of occurrence of the transmission errors is suppressed in next data transmission by retransmitting data with a shorter data length than a data length when a transmission error has occurred.

To implement the retransmission control method, the reception side must send a control signal as delivery confirmation back to the transmission side. More specifically, if no transmission error occurs, then the reception side sends ACK (ACKnowledgment) back to the transmission side, while if a transmission error has occurred, then the reception side sends NACK (Negative-ACKnowledgment) back to the transmission side.

The method of controlling retransmission upon occurrence of transmission error is explained here. At first, as the most basic method, there is a Stop & Wait method which is a method of deciding data to be transmitted next after ACK/NACK is received. If the Stop & Wait method is used, there is a Go back to N method as a method of solving a problem that a time up to confirmation of delivery becomes an idle time. The Go back to N method is such that transmission efficiency is enhanced by preparing a transmission buffer in the transmission side and performing data transmission even during the time until the delivery is confirmed. There is also a Selective Repeat method such that the transmission efficiency is further enhanced by preparing a reception buffer in the reception side. Moreover, a transmission method that combines the retransmission control with the error correction method is widely used in wireless communication.

Patent document 1: Japanese Patent Application Laid-Open No. H03-099538

DISCLOSURE OF INVENTION

Problem to be Solved by the Invention

Let us think about a case where data transmission is performed after error correction coding is performed by using a block code as an error correction code as shown in the example of FIG. 10. In this case, the code length, which is a unit of adding an error correction code, is non-variable. Therefore, it is necessary to take measures to make data lengths of data before the error correction code (redundancy symbol) is added uniform. This, however, leads to occurrence of padding. For example, if data is simply reduced to 9,000 bits because an error has occurred in transmission of data of 10,000 bits, the number of units of block codes to may remain the same as the number before being reduced due to the padding. Therefore, expected effect may not be obtained even with the technology described in Patent document 1.

Moreover, there are five units of block codes as shown in the example of FIG. 10, and an error detection process is performed on the block codes. As a result, it is detected that error occurs in the two blocks, and thus a transmission side reduces the data length and retransmits the four units of the block codes. In this case also, the expected effect cannot be obtained because the data length (=total data length of the four units of block codes) is too long.

Now let us think about a data transmission method in which a reception buffer is prepared in a reception side as explained in the Selective Repeat method and that performs reordering using a sequence number. As shown in FIG. 11, if transmission error occurs in a packet of sequence number #1 while no transmission error occurs in subsequent packets of sequence numbers #2 to #4, the packets of sequence numbers #2 to #4 are stored in the reception buffer until the packet of sequence number #1 is successfully received. Therefore, it is impossible to divide (make shorter) and retransmit the data transmitted as the packet of sequence number #1 by using the technology described in Patent document 1. This is because the sequence number #2 is already used and the sequence number cannot be given to the divided packet. Consequently, a packet of the same size is retransmitted, which makes it impossible to minimize the rate of occurrence of transmission errors.

The present invention has been achieved in view of the above discussion, and it is an object of the present invention to obtain a data-transmission control method and a transmission device capable of reducing the rate of occurrence of transmission errors and improving the throughput in data transmission performed by combining retransmission control with error correction.

Means for Solving Problem

To solve the above problems and to achieve the object, a data-transmission control method according to the present invention is implemented when transmitting data after dividing the data into a plurality of blocks and performing error correction when performing data transmission. The data-transmission control method includes a transmission-result obtaining step of obtaining additional information indicating a result of error correction process of received data and a result of data transmission (ACK (ACKnowledgement/NACK (Negative-ACK)) from a reception side; and a data-length deciding step of deciding a data length of data to be retransmitted when NACK is obtained as the result of data transmission so that a rate of occurrence of transmission errors upon retransmission is minimized, based on a number of blocks in which error correction has failed (number of correction-failed blocks) indicated by the additional information.

Effect of the Invention

The data-transmission control method according to the present invention provides an effect such that wasteful retransmission after a transmission error occurs is minimized to improve a throughput because a transmission station (transmission device) decides a length of data to be retransmitted based on additional information indicating a detailed data reception status notified from a reception side of the data.

BRIEF DESCRIPTION OF DRAWINGS

FIG. 3 is a sequence diagram of an example of a control sequence of the data-transmission control method according to the present invention;

FIG. 4 is a diagram of an example of a control signal used for delivery confirmation;

FIG. 5 is a diagram of a use example of additional information fields in the control signal;

FIG. 6 is a schematic for explaining a method of determining whether degradation occurs in signal reception quality;

FIG. 7 is a schematic for explaining another method of determining whether degradation occurs in signal reception quality;

FIG. 8 is a schematic of an example of an information-data coding process in a data-transmission control method according to a second embodiment;

FIG. 9 is a schematic of an example of an information-data coding process in a data-transmission control method according to a third embodiment;

EXPLANATIONS OF LETTERS OR NUMERALS

1 Transmission station (Transmission device)
2 Reception station
11, 11a, 14a, 21, 21a, 24a Controller
12, 12a, 15a, 22, 22a, 25a Transmitter
13, 13a, 16a, 23, 23a, 26a Receiver

BEST MODE(S) FOR CARRYING OUT THE INVENTION

Exemplary embodiments of the data-transmission control method according to the present invention are explained in detail below with reference to the accompanying drawings. It is noted that the present invention is not limited by these embodiments.

First Embodiment

Figure 1:
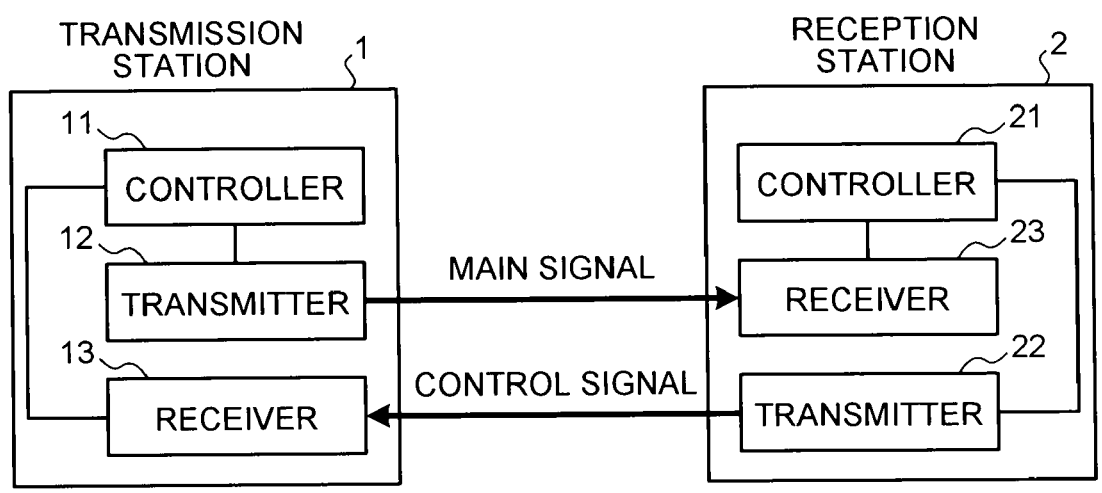
FIG. 1 is a diagram of a configuration example of a communication system according to a first embodiment which implements the data-transmission control method according to the present invention.

FIG. 1 is a diagram of a configuration example of a communication system according to a first embodiment that implements the data-transmission control method according to the present invention. The communication system includes a transmission station 1 that is the transmission device and a reception station 2 that is a reception device. The transmission station 1 includes a controller 11 that operates as a data-length deciding unit, a transmitter 12, and a receiver 13 that operates as a transmission-result obtaining unit. The reception station 2 includes a controller 21, a transmitter 22, and a receiver 23.

In the present invention, the transmission station 1 transmits a main signal containing information data to the reception station 2, and receives a control signal for delivery confirmation from the reception station 2. On the other hand, the reception station 2 receives the main signal from the transmission station 1, and transmits the control signal for delivery confirmation to the transmission station 1.

In the transmission station 1, the controller 11 controls the transmitter 12 and the receiver 13. The transmitter 12 transmits the main signal to the reception station 2 in response to an instruction from the controller 11. The receiver 13 receives the control signal for delivery confirmation from the reception station 2, and passes the control signal to the controller 11. In the reception station 2, the controller 21 controls the receiver 23 and the transmitter 22. The receiver 23 receives the main signal from the transmission station 1, performs error correction and calculation of CRC (Cyclic Redundancy Check), and outputs information indicative of whether error has occurred in receiving the main signal to the controller 21. The transmitter 22 transmits the control signal for delivery confirmation to the transmission station 1 in response to an instruction from the controller 21.

Figure 2:
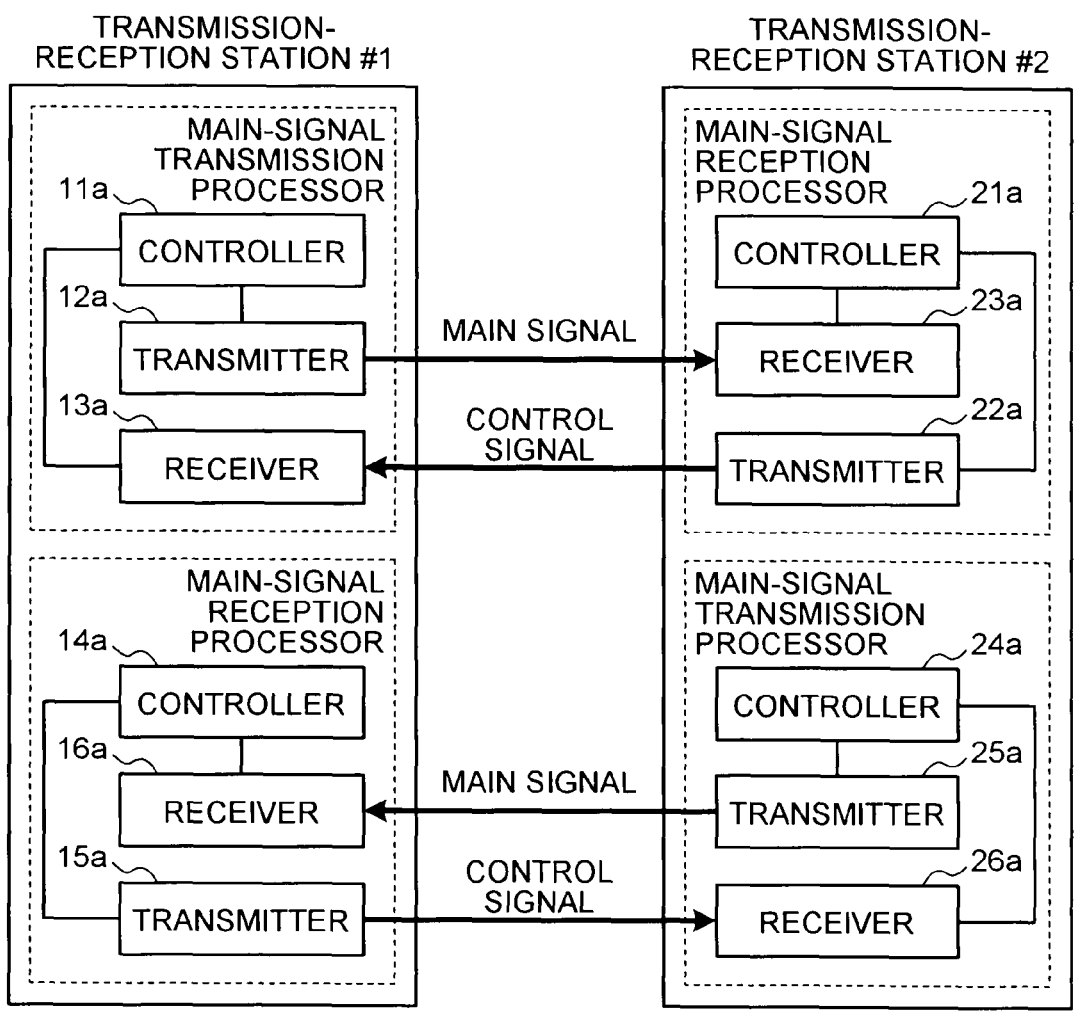
FIG. 2 is a diagram of a configuration example of transmission-reception stations constituting the communication system that implements the data-transmission control method according to the present invention.

In the example of FIG. 1, only the transmission station 1 is configured to transmit a main signal to the reception station 2. However, as shown in FIG. 2, it is possible to adopt a configuration in which the reception station 2 transmits a main signal to the transmission station 1. In such a configuration, each of the stations includes a portion that performs a main-signal transmission process and a portion that performs a main-signal reception process.

As shown in FIG. 2, a controller 11a, a transmitter 12a, and a receiver 13a form a main-signal transmission processor that performs a main-signal transmission process in a transmission-reception station #1, while a controller 14a, a transmitter 15a, and a receiver 16a form a main-signal reception processor that performs a main-signal reception process in the transmission-reception station #1. Further, a controller 21a, a transmitter 22a, and a receiver 23a form a main-signal reception processor that performs a main-signal reception process in a transmission-reception station #2, while a controller 24a, a transmitter 25a, and a receiver 26a form a main-signal transmission processor that performs a main-signal transmission process in the transmission-reception station #2. Moreover, in the transmission-reception stations #1 and #2, each unit of the main-signal transmission processors operates in the same manner as the corresponding unit having the same name in the transmission station 1, and each unit of the main-signal reception processors operates in the same manner as the corresponding unit having the same name in the reception station 2.

The data-transmission control method according to the present embodiment is explained below with reference to FIG. 1 and FIG. 3. FIG. 3 is a sequence diagram of an example of a control sequence of the data-transmission control method according to the present invention. Explained in the present embodiment is data transmission control provided when the transmission station 1 performs error correction coding using block codes.

Figure 10:
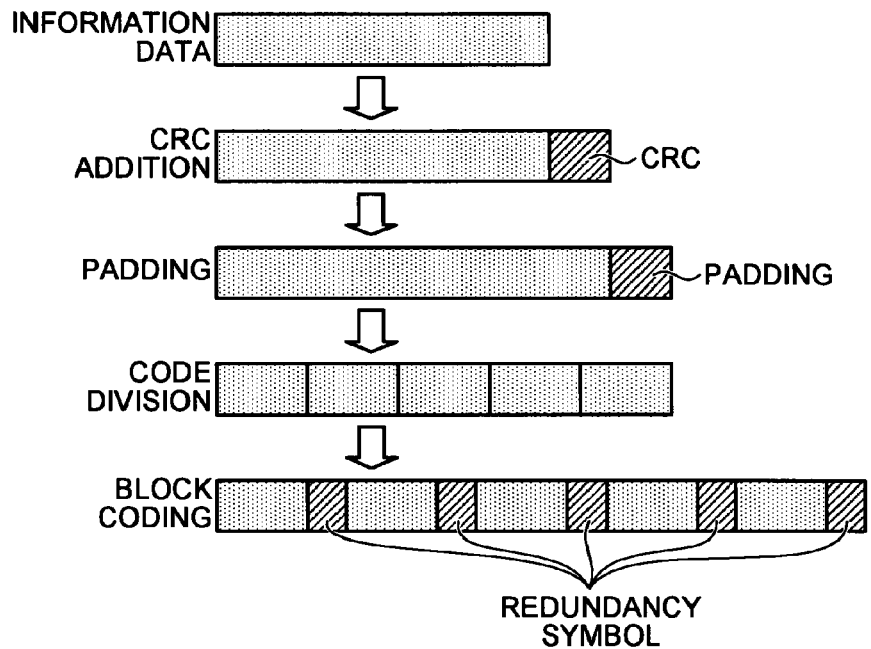
FIG. 10 is a schematic for explaining the problems in the conventional technology.
Figure 11:
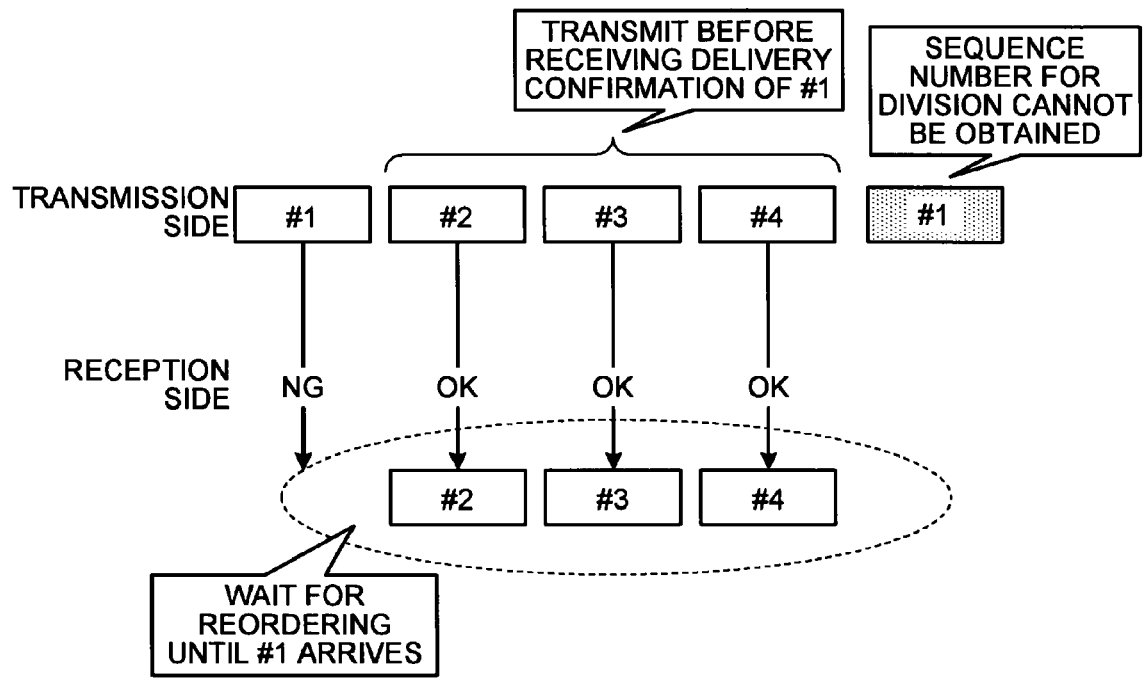
FIG. 11 is a schematic for explaining the problems in the conventional technology.

As shown in FIG. 3, the controller 11 of the transmission station 1 decides a data length of information data (how many bits of data to be transmitted), or performs scheduling (step S1). Concretely, the controller 11 calculates how many block codes (hereinafter, "codes") specified information data is divided into to be transmitted by the transmitter 12, and stores therein the calculated codes. Next, the controller 11 outputs a main-signal transmission instruction (message) to the transmitter 12 to instruct to transmit a main signal containing the information data according to the result of scheduling at step S1 (step S2). The transmitter 12 performs coding processes (addition of CRC, code division, and error correction coding, see FIG. 10) on the information data specified by the controller 11 (step S3), and transmits a signal (main signal) obtained as the result to the reception station 2 (step S4).

The receiver 23 of the reception station 2 performs decoding processes (error correction and recalculation of CRC) on the received main signal (step S5), and outputs a main-signal reception notification (message) containing the result to the controller 21 (step S6). When the received data contains a plurality of codes, the receiver 23 sends the notification together with the result of executing error correction to each code (result of error correction) to the controller 21. More specifically, the receiver 23 sends the notification together with the number of codes in which errors can be corrected, the number of codes in which errors cannot be corrected, and a maximum value of the numbers of error-corrected bits in the codes in which errors can be corrected (the number of error-corrected bits contained in the code with a largest number of error-corrected bits).

The controller 21 compares the CRC added to the received data with recalculated CRC, and determines whether there is an error in the received data (step S7). Next, the controller 21 generates a control signal containing additional information to notify the transmission station 1 of the result of determination at step S7 (for delivery confirmation), and outputs a control-signal transmission instruction (message) to instruct to transmit the generated control signal to the transmitter 22 (step S8). The additional information is information indicative of the number of codes in which errors cannot be corrected when the controller 21 instructs the transmitter 22 to transmit NACK, and is information indicative of the maximum value of the numbers of error-corrected bits (number of error-corrected bits contained in the code with the largest number of error-corrected bits) when transmission of ACK is instructed. The transmitter 22 transmits the control signal to the transmission station 1 in response to the control-signal transmission instruction from the controller 21 (step S9).

The receiver 13 of the transmission station 1 receives the control signal, and outputs a control-signal reception notification (message) to notify the controller 11 of the message to that effect (step S10). The controller 11 checks the received control signal, and decides a data length or the like of data to be transmitted next (scheduling) (step S11). A specific method of deciding the data length is implemented in such a manner that when the control signal indicates NACK, the controller 11 decides how many bits of data are to be transmitted (retransmitted) so that the rate of occurrence of transmission errors upon retransmission can be minimized, based on the number of codes stored at step S1 and the number of codes in which errors cannot be corrected and which is notified by the control signal. For example, if five codes are transmitted and error correction is failed on the two codes, the information data length is shortened so that the number of codes to be retransmitted is three or less. When the control signal indicates ACK, the controller 11 decides how many bits of data to be transmitted next based on the maximum value of the numbers of error-corrected bits notified by the control signal. In the scheduling operation when the control signal indicates ACK, the controller 11 executes the process of adjusting the number of blocks to be transmitted together with the process of selecting a transmission destination, which is explained later.

The units of the transmission station 1 and the reception station 2 execute the same processes as these at steps S2 to S10. Thereafter, the transmission station 1 repeats the same processes (corresponding to steps S2 to S10) to transmit the data to the reception station 2.

FIG. 3 shows the sequence of a situation in which coding/decoding is not performed upon transmission/reception of the control signal for simplification, however, the coding/decoding of the control signal may be performed to reliably deliver the control signal.

If the data-transmission control method according to the present invention is implemented by using a method called Block ACK for collectively sending back delivery confirmations for a plurality of received packets, the decoding process is executed on the received packets for which ACKs are to be sent back, and the maximum number of error-corrected bits in all the numbers of error-corrected bits obtained as the result of execution is notified by the control signal.

An example of the control signal for delivery confirmation is shown in FIG. 4. The control signal is formed of an ACK/NACK field that is one-bit field indicating whether retransmission is required and an additional information field that is N-bit field. The information in the additional information field can vary depending on the content of the ACK/NACK field. More specifically, if the ACK/NACK field is NACK, the information in the additional information field is the number of codes in which errors cannot be corrected, while if the ACK/NACK field is ACK, the information in the additional information field is the maximum value of the numbers of error-corrected bits.

As an example, if the additional information field is three bits (N=3), eight statuses can be shown. Therefore, as shown in FIG. 5, various meanings can be expressed using the additional information. For example, when the number of codes in which errors cannot be corrected (called "number of NG codes") is expressed, Meaning Part 1 indicates the number of continuous NG codes. Meaning Part 2 indicates the number of discrete NG codes. Meaning Part 3 indicates a combination of Meaning Parts 1 and 2, in which the number of continuous NG codes is represented up to the middle thereof and thereafter, the number of discrete NG codes is represented. Although detailed explanation is omitted, the case where the additional information indicates the number of error-corrected bits can also represent the same meaning as the case where the number of NG codes is indicated.

The case where the transmission station 1 performs the scheduling operation based on the additional information received concurrently when ACK is received from the reception station 2 is explained next. First explained is how the transmission station 1 determines whether the signal reception quality is degraded in the reception station 2 based on the additional information (=number of error-corrected bits) contained in the control signal indicating ACK. The controller 11 of the transmission station 1 receives the control signal indicating ACK from the reception station 2 through the receiver 13, and compares the additional information in the control signal with preset reference of the additional information. As a result of comparison, if a status where the additional information is high by $\Delta$ or more with respect to the reference continues $N_1$ times, then the status is determined as "quality degradation". Further, if a status where a difference from the reference is below $\Delta$ continues $N_2$ times, then the status is determined as "no quality degradation" (see FIG. 6).

It is noted that the controller 11 may perform a filtering process on the decoded result (control signal indicating ACK) received from the receiver 13 and determine whether quality is degraded based on the additional information contained in the decoded result after smoothing is executed. The filtering process is implemented by using, for example, an FIR (Finite Impulse Response) filter, an IIR (Infinite Impulse Response) filter, a maximum value filter, a minimum value filter, and a median filter.

When a data length of transmission data is to be decided, the controller 11 of the transmission station 1 controls the number of blocks to be initially transmitted based on the result of determination as to whether "occurrence of degradation in reception quality is detected in the reception station 2 based on the additional information". More specifically, the data length is decided so that when it is determined as "quality degradation", the number of blocks to be transmitted in initially transmitted data is set smaller than the case where it is determined as "no quality degradation". This enables wasteful retransmission to be avoided.

If there is any reception station other than the reception station 2 as a destination of the data transmission of the transmission station 1 (if there is a plurality of stations as destinations of data transmission), the controller 11 first decides to which of the reception stations the data is to be transmitted next based on the additional information contained in the control signals received from the reception stations upon decision of the data length of the transmission data. More specifically, the controller 11 determines whether quality is degraded in each of the reception stations based on the additional information, and decides to which of the reception stations the data is to be transmitted by using the result thereof. The reason that the processes are performed is because it is considered that if the data is transmitted when the reception quality is degraded in the reception station side, the possibility of occurrence of transmission errors may be high. Therefore, when it is determined as "quality degradation", the controller 11 transmits the data to other reception station until the control signal is received from the reception station which receives the initially transmitted data after the data is transmitted thereto. Thereafter, when the control signal is received from the reception station which receives the initially transmitted data and the content of the control signal indicates NACK, the initially transmitted data is segmented and the segmented data are retransmitted. Thus, it is possible to avoid the problem that the sequence number cannot be added, the problem occurring when the conventional retransmission method is combined with the Selective Repeat method.

The controller 11 of the transmission station 1 decides a retransmission method based on the result of determination as to whether "occurrence of degradation in reception quality is detected in the reception station 2 based on the additional information", regardless of whether there is a plurality of stations as destinations of the data transmission. For example, if "quality degradation" is determined when the Selective Repeat method is used, the controller 11 switches the method to a Go Back to N method or to a Stop & Wait method and retransmits data (also in this case, the data is segmented for retransmission).

When it is switched to the Go Back to N method, the transmission station will not discard already transmitted data until ACK for data is obtained from the reception station after the data is transmitted thereto. And, when obtaining NACK from the reception station, the transmission station first transmits the control signal for discarding the data if there is received data waiting for reordering in the reception station side, and then segments and retransmits the initially transmitted data.

When it is switched to the Stop & Wait method, the transmission station will not transmit next data until ACK for data is obtained from the reception station after the data is transmitted thereto. And, when obtaining NACK from the reception station, the transmission station segments and retransmits the initially transmitted data.

By switching between the retransmission methods in the above manner, it is possible to avoid the problem in the Selective Repeat method that the sequence number cannot be added. In the example as shown in FIG. 6, because there is only one threshold (difference between the additional information and the reference) to determine whether the quality is degraded, only two statuses such as "quality degradation" and "no quality degradation" can be determined, however, by providing two or more of the thresholds, the status of "quality degradation" may be segmented and the processes are performed thereon. For example, as shown in FIG. 7, two differences ($\Delta_1$, $\Delta_2$) are provided between the additional information and the reference. If the status where the additional information is high by a range from $\Delta_1$ and below $\Delta_2$ with respect to the reference continues N1 times, then the status is determined as "slight quality degradation", while if the status where it is high by $\Delta_2$ or more continues $N_3$ times, then the status is determined as "severe quality degradation". When it is determined as "severe quality degradation" indicating that the quality is severely degraded, the Stop & Wait method is used, while when it is determined as "slight quality degradation" indicating that the quality is not so severely degraded, the method is switched to the Go back to N method. The Go back to N method is more efficient than the Stop & Wait method, and thus the retransmission method can be switched from one to the other according to the quality of a transmission path.

The operation of switching between the retransmission methods when quality degradation is detected is explained, however, the case where quality improvement is detected, the retransmission method may also be switched according to the detection result. In this case also, it is simply determined whether the quality is improved based on comparison between the additional information and the reference value used to determine whether the quality is improved.

As explained above, in the present embodiment, the reception station of data transmits the control signal (ACK/NACK) indicating whether the data is successfully received (whether transmission error occurs) with additional information (maximum value of the numbers of error-corrected bits/the number of block codes in which errors cannot be corrected) indicating the result of error correction of the received data. The transmission station decides the length of data to be retransmitted based on the additional information received from the reception station. Thus, it is possible to minimize wasteful retransmission after occurrence of transmission error and improve the throughput.

When the error correction code and retransmission control are combined with each other, the transmission station decides a data length of initially transmitted data to be transmitted next based on the additional information received from the reception station. Therefore, wasteful retransmission is reduced, which allows improved throughput. Moreover, when the error correction code and retransmission control are combined with each other, the transmission station decides a reception station to which data is transmitted next based on the additional information received from the reception station. Therefore, wasteful retransmission is reduced, which allows improved throughput. Furthermore, when the error correction code and retransmission control are combined with each other, the transmission station decides a retransmission method based on the additional information received from the reception station. Therefore, wasteful retransmission is reduced, which allows improved throughput.

Second Embodiment

A data-transmission control method according to a second embodiment is explained next. Explained in the first embodiment is the data-transmission control provided when error correction coding is performed by using the block code. Explained in the present embodiment is data-transmission control provided when error correction coding is performed by a convolutional coding process. More specifically, the data-transmission control provided when error correction is performed by using a convolutional code, a turbo code, and LDPC (Low Density Parity Check) is explained. It is noted that the configuration of a communication system for implementing the data-transmission control method according to the present embodiment is the same as the communication system according to the first embodiment. The data-transmission control method according to the present embodiment is explained with reference to FIG. 1 and FIG. 8. FIG. 8 is a schematic of an example of an information-data coding process in the data-transmission control method according to the second embodiment.

The convolutional code, the turbo code, and the LDPC are divided into a predetermined block length (which is called Code Segment Block in 3GPP (The 3rd Generation Partnership Project)) to perform parallel processing of coding and decoding, and then an error correction code is added thereto. Therefore, the data-transmission control method according to the present embodiment using any of these codes can be implemented by replacing the "code" with "block" in the process according to the first embodiment. Because of this, the control sequence is the same as that of the first embodiment (see FIG. 3). Explained here is only a portion different from the process explained in the first embodiment, of the processes performed by the transmission station 1 and the reception station 2 according to the present embodiment with reference to FIG. 3.

In the present embodiment, at step S1 of FIG. 3, the controller 11 decides the data length of the information data (scheduling), calculates how many blocks specified information data is divided into to be transmitted by the transmitter 12, and stores therein the calculated blocks.

At step S5, the receiver 23 performs a decoding process (error correction and recalculation of CRC) on the received signal, and outputs the main-signal reception notification to the controller 21. At this time, when the received data is formed of a plurality of blocks, the receiver 23 notifies the controller 21 of the notification with the results of executing error correction to each of the blocks. More specifically, the receiver 23 notifies the controller 21 of the number of blocks in which errors can be corrected and of the number of blocks in which errors cannot be corrected combined with the maximum value of the numbers of error-corrected bits of the blocks in which errors can be corrected (the number of error-corrected bits contained in the block with a largest number of error-corrected bits).

At step S8, when transmission of NACK is instructed to the transmitter 22, the controller 21 generates a control signal containing information for the number of blocks in which errors cannot be corrected, and generates a control signal containing information for the maximum value of the numbers of error-corrected bits when transmission of ACK is instructed. And the control-signal transmission instruction to instruct to transmit the generated control signal is output to the transmitter 22.

At step S11, when receiving the control signal indicating NACK, the receiver 13 decides how many bits of data are to be transmitted (retransmitted) (the data length of the information data) based on the number of blocks which is stored and is last transmitted and the number of blocks in which errors cannot be corrected notified by the control signal. For example, if five blocks are transmitted and error correction is failed on two codes, the information data is shortened so that the number of blocks to be retransmitted becomes three or less. When receiving the control signal indicating ACK, the receiver 13 decides how many bits of data are to be transmitted based on the maximum value of the numbers of error-corrected bits notified by the control signal.

The scheduling operation performed by the transmission station 1 (controller 11) based on the additional information when ACK is received from the reception station 2 is the same as that explained in the first embodiment.

A case of performing the error correction process by using block codes and of setting the additional information upon returning ACK as the number of error-corrected bits is explained. However, if the convolutional code is used for the error correction process, an error rate of recoding may be used as the additional information, the error rate of recoding being obtained by comparing a bit string obtained by coding again a bit string after being decoded with a bit string before being decoded. If the turbo code is used, a result of decoding is extracted in the middle of the decoding process repeatedly performed by a turbo decoder, and the result of CRC check thereof may be set as the additional information. Furthermore, if the LDPC code is used, parity check is performed by using a parity-check matrix, and a parity ratio of zero may be set as the additional information.

As explained above, in the present embodiment, the convolutional code, the turbo code, and the LDPC are used for the error correction performed upon data transmission. And, similarly to the first embodiment, the transmission station of data performs the scheduling operation based on the additional information contained in the control signal (ACK/NACK) received from the reception station. Accordingly, the same effect as that of the first embodiment can be obtained in the data transmission in which error correction is performed by using the convolutional code, the turbo code, and the LDPC.

Third Embodiment

A data-transmission control method according to a third embodiment is explained next. Explained in the first embodiment is the data-transmission control provided when the data transmission is performed by adding one CRC to the information data. Explained in the present embodiment is data-transmission control provided when data transmission is performed by dividing the information data into fixed-length PDUs (which are called Transport Block in 3GPP) and adding CRC to each of the PDUs. The configuration of a communication system implementing the data-transmission control method according to the present embodiment is the same as the communication system according to the first embodiment.

The data-transmission control method according to the present embodiment is explained below with reference to FIG. 1 and FIG. 9. FIG. 9 is a schematic of an example of an information-data coding process in the data-transmission control method according to the third embodiment. The data-transmission control method, in which data transmission is performed after the coding process is performed, can be implemented by replacing "code" with "PDU" in the data-transmission control method according to the first embodiment. Therefore, the control sequence is the same as that of the first embodiment (see FIG. 3). Explained here is only a process, different from the processes explained in the first embodiment, in the control sequences performed by the transmission station 1 and the reception station with reference to FIG. 3.

In the present embodiment, at step S1 of FIG. 3, the controller 11 decides a data length of the information data (scheduling), and further calculates how many PDUs specified information data is divided into to be transmitted by the transmitter 12, and stores therein the calculated PDUs.

At step S3, the transmitter 12 obtains a signal (main signal) by executing the coding process (process of generating PDU from data, adding CRC to each of generated PDUs, and performing error correction coding) on the information data specified by the controller 11, and transmits the obtained signal to the reception station 2.

At step S5, the receiver 23 performs the decoding process (process of performing error correction and re-calculating CRC of each PDU) on the received signal, and outputs a main-signal reception notification to the controller 21.

At step S8, the controller 21 generates a control signal to notify the transmission station 1 of the result of determination at step S7 (for delivery confirmation), and outputs a control-signal transmission instruction to instruct to transmit the generated control signal to the transmitter 22. It is noted that when transmission of NACK is instructed to the transmitter 22, the controller 21 generates a control signal containing information for the number of PDUs in which CRC check is NG.

At step S11, when receiving the control signal indicating NACK, the receiver 13 decides how many bits of data are to be transmitted (retransmitted) (data length of information data) based on the number of PDUs of data transmitted last time which are stored and also based on the number of PDUs in which CRC check is NG notified by the control signal. For example, if five PDUs are transmitted and there are two PDUs in which CRC check is NG, the information data is shortened so that the number of PDUs to be retransmitted is three or less.

As explained above, in the present embodiment, when data transmission is performed by dividing the information data into fixed length PDUs and adding CRC to each of the PDUs, the reception station of the data notifies the transmission station of the information for the result of CRC check for each PDU (number of PDUs in which CRC check error occurs), and the transmission station decides the length of data to be retransmitted based on the notified information. Accordingly, wasteful retransmission is reduced, which allows improved throughput.

INDUSTRIAL APPLICABILITY

As explained above, the data-transmission control method according to the present invention is useful for communication systems, and is particularly suitable for a data-transmission control method used in a communication system of combining error correction with retransmission control (e.g., Power Line Communication, 3GPP Evolved UTRA).

The invention claimed is:

1. A data-transmission control method implemented when transmitting data after dividing the data into a plurality of blocks and performing error correction when performing data transmission, the data-transmission control method comprising:
   a transmission-result obtaining step of obtaining additional information indicating a result of error correction process of received data and a result of data transmission (ACK (ACKnowledgement/NACK (Negative-ACK)) from a reception side; and
   a data-length deciding step of deciding a data length of data to be retransmitted when NACK is obtained as the result of data transmission so that a rate of occurrence of transmission errors upon retransmission is minimized, based on a number of blocks in which error correction has failed (number of correction-failed blocks) indicated by the additional information.

2. The data-transmission control method according to claim 1, wherein when ACK is obtained as the result of data transmission,
   at the data-length deciding step, a data length of data to be transmitted next is decided based on a number of error-corrected bits contained in the block with a largest number of error-corrected bits indicated by the additional information.

3. The data-transmission control method according to claim 1, wherein when ACK is obtained as the result of data transmission and there is a plurality of destinations of data transmission,
   at the data-length deciding step, a destination to which data is to be transmitted next is decided based on a number of error-corrected bits contained in the block with a largest number of error-corrected bits indicated by the additional information.

4. The data-transmission control method according to claim 2, wherein when ACK is obtained as the result of data transmission and there is a plurality of destinations of data transmission,
   at the data-length deciding step, a destination to which data is to be transmitted next is further decided based on the number of error-corrected bits contained in the block with the largest number of error-corrected bits indicated by the additional information.

5. The data-transmission control method according to claim 1, wherein when ACK is obtained as the result of data transmission,
   at the data-length deciding step, it is detected whether a status of a transmission path has changed based on a number of error-corrected bits contained in the block with a largest number of error-corrected bits indicated by the additional information, and an appropriate data retransmission method is selected from among a plurality of data retransmission methods based on a result of detection.

6. The data-transmission control method according to claim 1, wherein a number of blocks in which error occurs in CRC (Cyclic Redundancy Check) check executed for each block is used instead of the number of correction-failed blocks.

7. A transmission device divides data into a plurality of blocks, subjects the data to error correction coding, and then performs data transmission, the transmission device comprising:
   a transmission-result obtaining unit that obtains additional information indicating a result of error correction process of received data and a result of data transmission (ACK (ACKnowledgement/NACK (Negative-ACK)) from a reception side; and
   a data-length deciding unit that decides a data length of data to be retransmitted when NACK is obtained as the result of data transmission so that a rate of occurrence of transmission errors upon retransmission is minimized, based on a number of blocks in which error correction has failed (number of correction-failed blocks) indicated by the additional information.

8. The transmission device according to claim 7, wherein when ACK is obtained as the result of data transmission,
the data-length deciding decides a data length of data to be transmitted next based on a number of error-corrected bits contained in the block with a largest number of error-corrected bits indicated by the additional information.

9. The transmission device according to claim 7, wherein when ACK is obtained as the result of data transmission and there is a plurality of destinations of data transmission,
the data-length deciding unit decides a destination to which data is to be transmitted next based on a number of error-corrected bits contained in the block with a largest number of error-corrected bits indicated by the additional information.

10. The transmission device according to claim 8, wherein when ACK is obtained as the result of data transmission and there is a plurality of destinations of data transmission,
the data-length deciding unit further decides a destination to which data is to be transmitted next based on the number of error-corrected bits contained in the block with the largest number of error-corrected bits indicated by the additional information.

11. The transmission device according to claim 7, wherein when ACK is obtained as the result of data transmission,
the data-length deciding detects whether a status of a transmission path has changed based on a number of error-corrected bits contained in the block with a largest number of error-corrected bits indicated by the additional information, and selects an appropriate data retransmission method from among a plurality of data retransmission methods based on a result of detection.

12. The transmission device according to claim 7, wherein a number of blocks in which error occurs in CRC (Cyclic Redundancy Check) check executed for each block is used instead of the number of correction-failed blocks.

* * * * *